United States Patent [19]

Teranishi et al.

[11] 4,114,076
[45] Sep. 12, 1978

[54] CONTROL SYSTEM FOR A MOTOR HAVING A SHUNT FIELD WINDING

[75] Inventors: Takanori Teranishi, Aichi; Toshihiko Nakashima, Chiryu, both of Japan

[73] Assignee: Nippondenso Co., Ltd., Kariya, Japan

[21] Appl. No.: 788,429

[22] Filed: Apr. 18, 1977

[51] Int. Cl.² ............................................. H02P 1/20
[52] U.S. Cl. .................... 318/421; 318/139; 318/339; 318/349; 318/359; 318/428
[58] Field of Search ............... 318/139, 339, 349, 350, 318/356, 357, 358, 359, 420, 421, 422, 423, 428

[56] References Cited

U.S. PATENT DOCUMENTS

| | | | |
|---|---|---|---|
| 3,515,970 | 6/1970 | Weiser | 318/428 |
| 3,716,768 | 2/1973 | Mason | 318/349 |
| 3,962,612 | 6/1976 | Kawasaki | 318/356 |

*Primary Examiner*—Robert K. Schaefer
*Assistant Examiner*—Eugene S. Indyk
*Attorney, Agent, or Firm*—Cushman, Darby & Cushman

[57] ABSTRACT

Control system for a motor having a shunt field winding is disclosed. In an electric vehicle, when an accelerator pedal is stepped on at the start, a field current is increased to increase the rotational speed of the motor in accordance with the stepped angle of the pedal. In the operating region where the rotational speed of the motor is not increased in accordance with the increase of the field current, an armature current is in turn increased and inversely the field current is decreased in order to further increase its rotational speed. Thus, an impact at the start can be reduced.

10 Claims, 17 Drawing Figures

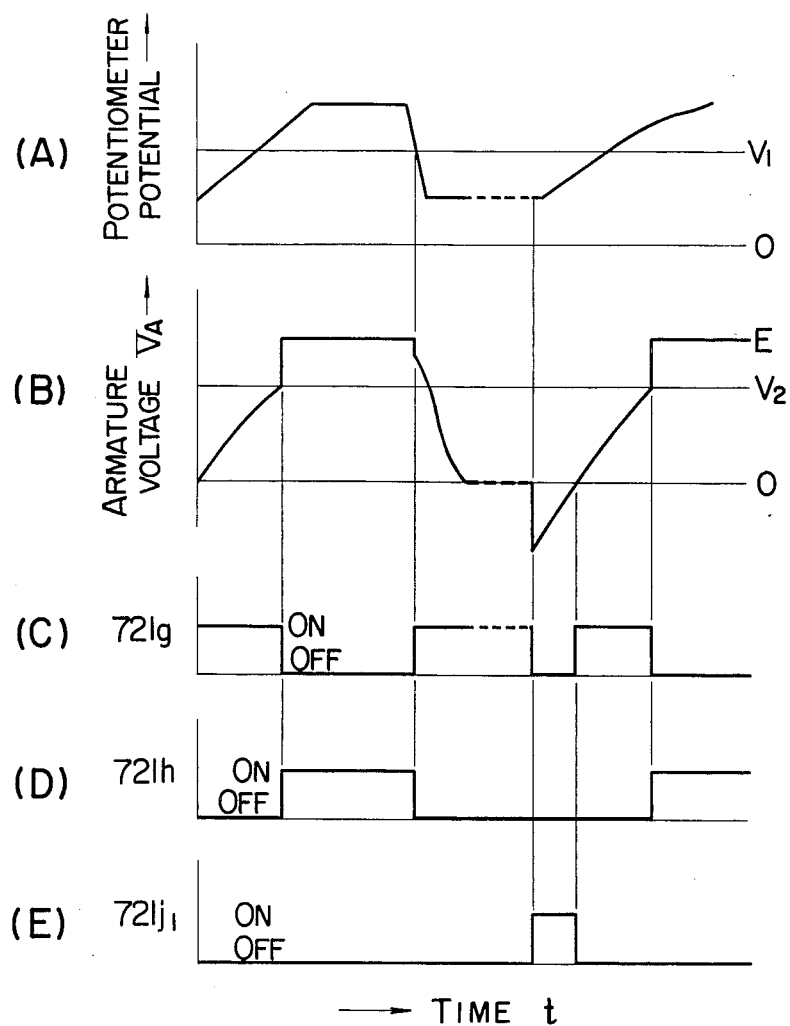

CONTROL SYSTEM FOR A MOTOR HAVING A SHUNT FIELD WINDING

The present invention relates to a control system for a motor having a shunt field winding, and more particularly to such a control system in which a combination of armature resistor control and field control is used to effect fine-speed control in a low speed range and reduce impact at the start.

In a prior art armature resistor control for a conventional d.c. motor such as d.c. series motor or d.c. shunt motor, the number of resistor stages could not be increased because of cost problems and hence fine-speed control could not be attained. Furthermore, when a combination of the armature resistor control and a field control for the d.c. motor was used to effect the speed control a minimum speed was established when resistors are connected to an armature circuit while a full current was supplied to the field. However, in this system, since the range between zero speed and the minimum speed is relatively large, abrupt acceleration or deceleration occurs, which is very disadvantageous in the speed control of automobiles or the like. In addition, start-up was effected with the full current being supplied to the field while the resistors were connected to the armature circuit. In this case, however, the start torque is so high that a large shock is imparted at the start-up.

It is a primary object of the present invention to overcome the above drawbacks and provide a control system for a motor having a shunt field winding wherein a field control is used to start the motor as far as the rotational speed increases, whereby the speed control from zero speed to a low speed range can be effected smoothly and the start torque can also be controlled to relieve the shock at the start-up.

It is another object of the present invention to provide a control system for a motor having a shunt field winding wherein when the speed is to be increased, armature controlling resistors are shorted while the flux of the shunt field winding is increased to a maximum, which is then decreased as the speed increases so that the speed can be controlled over a wide range in an efficient manner by the control of a small field current relative to the armature current.

It is another object of the present invention to provide a control system for a motor having a shunt field winding wherein the motor is smoothly accelerated at the maximum torque when an acceleration device such as an accelerator of an electric vehicle is rapidly operated by an operator.

It is a still another object of the present invention to provide the control system for a motor having a shunt field winding wherein during a reverse braking, a resistor is connected to an armature circuit to limit the armature current and simultaneously a predetermined field current is supplied in order to perform its smooth control.

FIG. 16 shows waveforms for explaining the operation of the system shown in FIG. 15.

Figure 1:
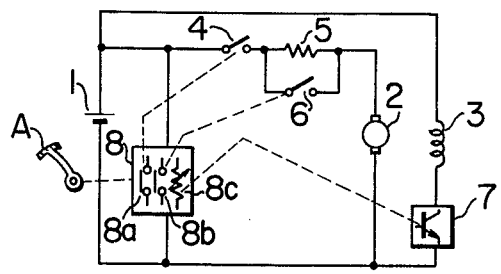
FIG. 1 is an electrical circuit diagram illustrating one embodiment of a motor control system embodying the present invention.

The present invention is now explained in conjunction with a first embodiment thereof illustrated in the drawings.

In FIG. 1, numeral 1 denotes a battery as a d.c. power supply, 2 denotes an armature of a D.C. motor for driving an electric motor, 3 denotes a shunt field winding of the D.C. motor, 4 denotes a first-speed magnet switch for controlling the D.C. motor, 5 denotes a resistor for controlling the armature, 2, 6 denotes a second-speed magnet switch for shunting the resistor 5, 7 denotes a field controller for controlling the field winding 3, and 8 denotes an accelerator responsive speed controller for controlling the magnet switches 4 and 6 and the field controller 7 in response to the operation of an acceleration means such as an accelerator pedal A. The field controller 7 may comprise a transistor chopper circuit, and the accelerator responsive speed controller 8 may comprise a first-speed limit switch 8a which is closed upon a slight pressure on the accelerator pedal A to close the first-speed magnet switch 4, a second-speed limit switch 8b which is closed when the accelerator pedal has been stepped in through a predetermined angle to close the second-speed magnet switch 6, and a potentiometer 8c a resistance of which is changed with the step-in angle of the accelerator pedal A to change a duty factor of the transistor chopper circuit.

The control system of the present invention is now explained with reference to the above construction. As the accelerator pedal A is slightly depressed the first-speed limit switch 8a of the accelerator responsive speed controller 8 is closed to close the first-speed magnet switch 4 and a signal is issued from the potentiometer 8c to the field controller 7 to energize the shunt field winding 3. As a result, a current flows into the armature 2 from the battery 1 through the resistor 5 so that the motor rotates. A signal for controlling the current in the shunt field winding 3 is issued from the field controller 7 by the potentiometer 8c of the accelerator responsive controller 8, the resistance of which changes with the step-in angle of the accelerator pedal A, so that the current in the shunt field winding 3 is controlled by the field controller 7 to control a magnetic flux of the motor. Since a rotation speed N and a torque T are given by $$N = \frac{E - I(R + r)}{\Phi} \cdot k_1$$

and $T = k_2 \cdot \Phi \cdot I$, respectively, a relation between the magnetic flux $\Phi$ and the rotation speed N is given by:

$$N = \frac{E}{\Phi} \cdot k_1 - \frac{T(R + r)}{\Phi^2} \cdot k_3$$

where E is a battery voltage, r is a resistance of the armature, R is a resistance of the resistor 5 and $k_1$, $k_2$, $k_3$ are constants. For a given battery voltage E, torque T and the resistance R, a relation between the magnetic flux $\Phi$ and the rotation speed N is represented by a characteristic curve shown in FIG. 2, wherein the rotation speed N can be controlled by the magnetic flux $\Phi$. Accordingly, by increasing the magnetic flux $\Phi$ of the shunt field winding 3 with the increase of the speed with the rotation speed N being limited in a range from zero to a maximum value, a speed control in a low speed range can be attained.

Next, as the accelerator pedal A is depressed through a predetermined angle so that the rotation speed N in the above equation reaches the maximum value, the second-speed limit switch 8b of the accelerator responsive controller 8 is closed to close the second magnet switch 6 and a maximum current flows in the shunt field winding 3 by the field controller 3 to fully energize the field. When the speed is to be further increased, as the depression angle of the accelerator pedal A is increased the energization of the field is gradually decreased to control the rotation speed N, resulting in a relation between the torque T and the rotation speed N as shown in FIG. 3, wherein on a torque line of $T = t$ a point a is at zero speed, a point b is near a maximum rotation speed defined by the rotation speed characteristic of $$N = \frac{E}{\Phi} \cdot k_1 - \frac{T(R + r)}{\Phi^2} \cdot k_3,$$

a point c corresponds to a fully energized field point in which the resistor 5 is shortcircuited to connect the armature 2 directly to the battery 1, and a point d corresponds to a weakly energized field point in which the armature 2 is directly connected to the battery 1.

Figure 3:
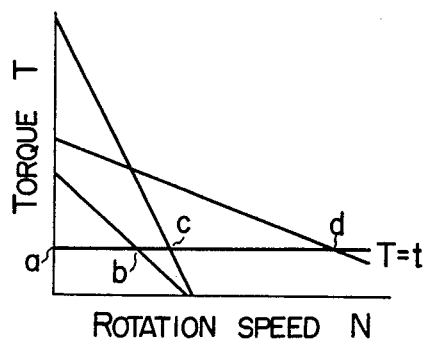
FIG. 3 shows a characteristic curve illustrating a relation between the rotation speed N and a torque T for the system shown in FIG. 1.
Figure 4:
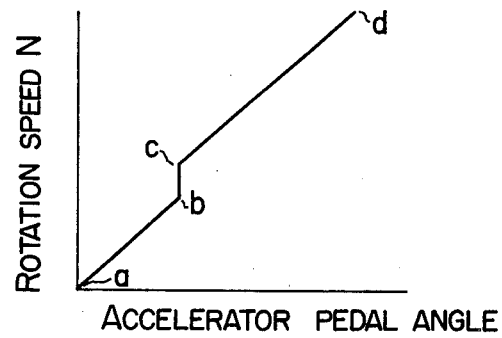
FIG. 4 shows a characteristic curve illustrating a relation between an accelerator pedal angle and the rotation speed N for the system shown in FIG. 1.

FIG. 4 shows a characteristic of the step-in angle of the accelerator pedal A and the rotation speed N for the torque line of $T = t$, wherein points a, b, c and d correspond to the points shown in FIG. 3.

Figure 5:
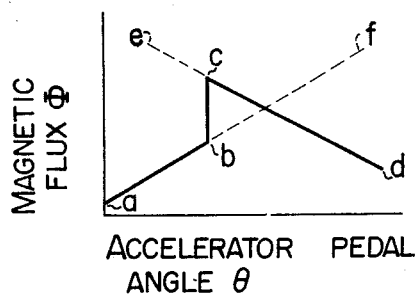
Fig. 5 shows a characteristic curve illustrating a relation between the accelerator pedal angle and the magnetic flux Φ for the system shown in FIG. 1.

FIG. 5 shows a characteristic of the step-in angle of the accelerator pedal A and the magnetic flux $\Phi$, wherein the points a, b, c and d correspond to the points shown in FIGS. 3 and 4. In FIGS. 3 through 5, a region between the points a and b is a field control region in which the current flows into the armature 2 through the resistor 5 and the rotation speed N as defined by $$N = \frac{E}{\Phi} k_1 - \frac{T(R + r)}{\Phi^2} \cdot k_3$$

changes from zero to approximately maximum value, a region between the points b and c is a fully energized field region in which the resistor 5 is shorted to allow the maximum current to flow into the shunt field winding 3, and a region between the points c and d is a weakly energized field region in which the resistor 5 is shorted and the field is weakly energized.

As described above, in the region between the points a and b in FIG. 3, the resistor 5 is inserted in the armature circuit to control the current in the shunt field winding 3 for controlling the magnetic flux $\Phi$ so that the rotation speed N is controlled from zero in a smooth manner. In this manner, a fine-speed control in the low speed range is attained.

Figure 6:
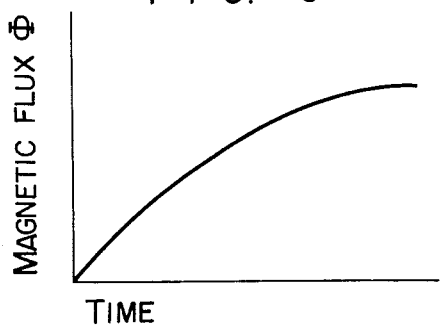
FIG. 6 shows a characteristic curve illustrating a relation between a time and the magnetic flux Φ for the system shown in FIG. 1.
Figure 7:
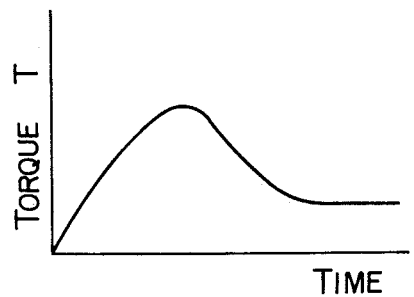
FIG. 7 shows a characteristic curve illustrating a relation between the time and the torque T for the system shown in FIG. 1.

At the start-up, the resistor 5 is connected to the armature circuit and the field current in the shunt field winding 3 is controlled by the field controller 8 such that it increases at a predetermined rate with time to produce a characteristic of the time and the magnetic flux $\Phi$ as shown in FIG. 6. In this case, the output torque T of the motor increases with the time along a predetermined curve until it reaches a maximum value, thence it gradually decreases, as shown in FIG. 7. In this manner, by controlling the field current at the start-up, the output torque T of the motor can be gradually increased to effect smooth acceleration.

Figure 8:
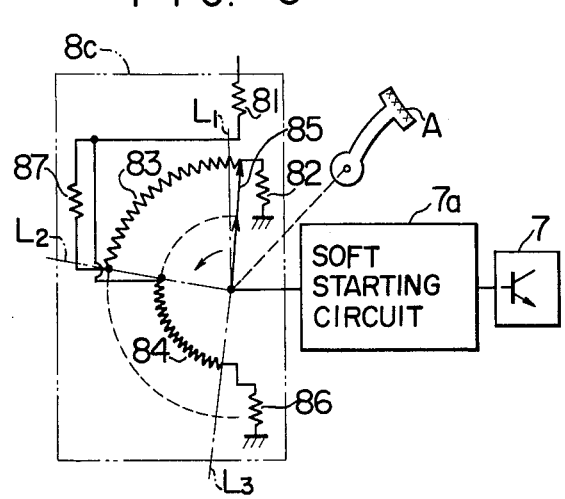
FIG. 8 is an electrical circuit diagram illustrating an example of a major section of the system shown in FIG. 1.

Now, referring to FIG. 8, an example of changing the magnetic flux of the shunt field winding 3 relative to the step-in angle of the accelerator pedal A in a manner shown in FIG. 5 is explained. Numeral 7a denotes a soft starter circuit, which may be a conventional circuit comprising a capacitor, for assuring soft change of the field control by the field controller 7 even when the resistance of the potentiometer 8c abruptly changes. The potentiometer 8c comprises fixed resistors 81, 82, 86 and 87, sliding resistors 83 and 84 and a sliding arm 85 which slides on the resistors 83 and 84 in response to the step-in of the accelerator pedal A and which is connected to the field controller 7 through the soft starter circuit 7a. When the accelerator pedal A is slightly depressed such that the sliding arm 85 reaches a point $L_1$, the first-speed limit switch 8a is closed. As the accelerator pedal A is further depressed so that the sliding arm 85 is between the points $L_1$ and $L_2$, the sliding arm 85 slides on the resistor 83 and an output potential of the potentiometer 8e assumes a potential determined by the fixed resistors 81, 82 and 87 and the slide resistor 83 which is variable with the position of the sliding arm 85. Accordingly, the output potential increases gradually from a predetermined value as the depression angle of the accelerator pedal A is increased so that the magnetic flux as shown in the region between the points $a$ and $b$ in FIG. 5 is produced by the shunt field winding 3. When the accelerator pedal A is further depressed so that the sliding arm 85 reaches the position $L_2$, the second-speed limit switch 8b is closed and the sliding arm 85 contacts an end of the slide resistor 84. As a result, the output potential of the potentiometer 8c becomes maximum so that the shunt field winding 3 produces the maximum magnetic flux (fully energized field) at the point $c$ in FIG. 5. As the accelerator pedal A is further depressed so that the sliding arm 85 is positioned between the points $L_2$ and $L_3$, the sliding arm 85 slides on the slide resistor 84. As a result, the output potential of the potentiometer 8c assumes a potential determined by the fixed resistors 81 and 86 and the slide resistor 84 which is variable with the position of the sliding arm 85. The output potential gradually reduces from the maximum value as the depression angle of the accelerator pedal A increases so that the shunt field winding 3 produces the magnetic flux as shown in the region between the points $c$ and $d$ in FIG. 5.

While the potentiometer 8c in the embodiment of FIG. 8 is designed such that a predetermined characteristic is defined by the resistance of the potentiometer 8c in accordance with the depression angle of the accelerator pedal A, the potentiometer 8c may be used merely to detect the depression angle of the accelerator pedal A and a function generator which is operated in accordance with the resistance of the potentiometer 8A is incorporated to produce the predetermined characteristic in accordance with the depression angle of the accelerator pedal A.

Figure 9:
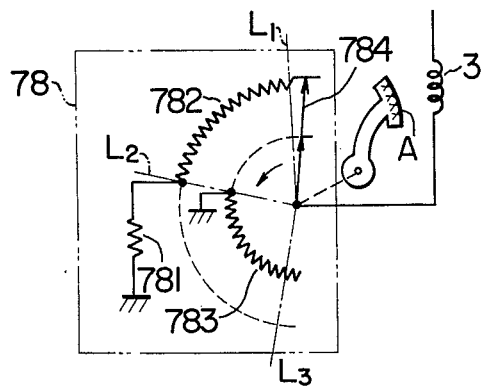
FIG. 9 is an electrical circuit diagram illustrating another example of the major section of the system shown in FIG. 1.

FIG. 9 shows a modification in which the current flowing in the shunt field winding 3 is controlled by a potentiometer 78 which is responsive to the accelerator pedal A so that the potentiometer 78 also serves as the field controller 7. The potentiometer 78 comprises a fixed resistor 781, slide resistors 782 and 783 and a sliding arm 784 which slides on the slide resistors 782 and 783 in response to the step-in of the accelerator pedal A and which is connected to the shunt field winding 3. When the accelerator pedal A is slightly depressed so that the sliding arm 784 reaches the point $L_1$, the first-speed limit switch 8a is closed. As the accelerator pedal A is further depressed so that the sliding arm 784 is positioned between the points $L_1$ and $L_2$, the sliding arm 784 slides on the slide resistor 782 so that the resistance of the potentiometer 78 is defined by a series of resistance of the fixed resistor 781 and a fraction of the slide resistor 782 determined by the position of the sliding arm 784. This resistance gradually decreases from a predetermined value as the depression angle of the accelerator pedal A increases. As a result, the shunt field winding 3 produces the magnetic flux as shown by the region between the points $a$ and $b$ in FIG. 5. As the accelerator pedal A is further depressed so that the sliding arm 784 reaches the position $L_2$, the second-speed limit switch 8b is closed and the sliding arm 784 contacts the ground end of the slide resistor 783. As a result, the resistance of the potentiometer 78 becomes zero so that the shunt field winding 3 produces the maximum magnetic flux (fully energized field) as shown at the point $c$ in FIG. 5. As the accelerator pedal A is further stepped in, so that the sliding arm 784 is positioned between the points $L_2$ and $L_3$, the sliding arm 784 sliding slides on the slide resistor 783 so that the resistance of the potentiometer 78 is defined by a fraction of the slide resistor 783 determined by the position of the sliding arm 784. This resistance gradually increases from the minimum (zero) as the depression angle of the accelerator pedal A increases so that the shunt field winding 3 produces the magnetic flux as shown in the region between the points $c$ and $d$ in FIG. 5.

In the above embodiment, when it is desired to provide a soft starting function, only the movement of the sliding arm 784 toward the increase of speed may be delayed by a one-way oil-damper or the like.

Figure 10:
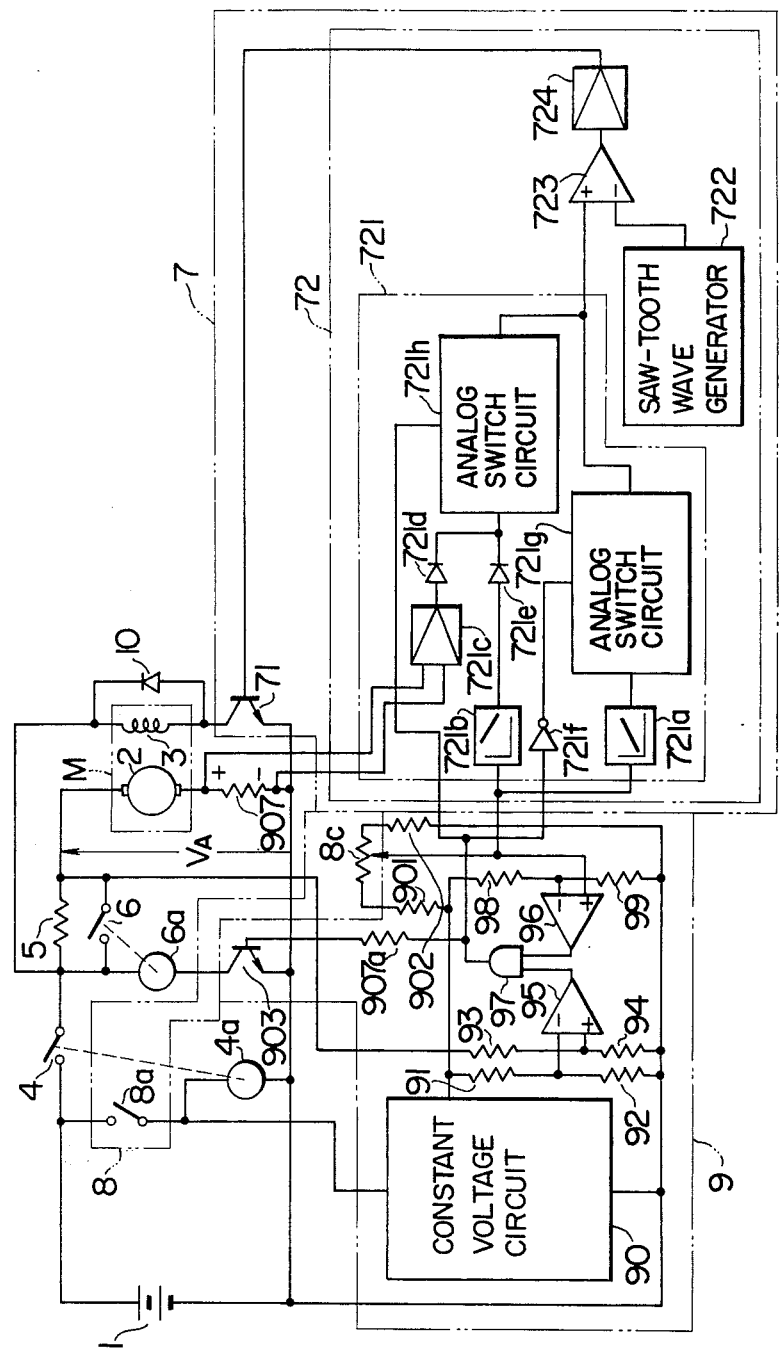
FIG. 10 is an electrical circuit diagram illustrating another embodiment of the motor control system embodying the present invention.

Referring to FIG. 10, a second embodiment of the present invention is explained. In FIG. 10, like parts are represented by like numerals and not explained here. Numeral 4a denotes a first-speed magnet switch for controlling a D.C. motor M, 6a denotes an exciting coil of a second-speed magnet switch for shorting the resistor 5, 90 denotes a constant voltage circuit, 91, 92, 93, 94, 98, 99, 901 and 902 denote voltage dividing resistors, 95 and 96 denote known comparators which may be Schmidt circuits, 97 denotes a logical AND circuit, 907a denotes a resistor, and 903 denotes a transistor. Numeral 721a denotes a first command signal generator which receives a potential of the potentiometer 8c to determine the magnitude of a current in the shunt field winding 3 of the motor M. It generates a first command signal in response to the depression angle of the accelerator pedal, which command signal causes the magnetic flux $\Phi$ to increase in a manner $a - b - f$ shown in FIG. 5. Numeral 721b denotes a second command signal generator which receives a potential of the potentiometer 8c to determine the magnitude of the current in the shunt field winding 3. It generates a second command signal in response to the depression angle of the accelerator pedal, which command signal causes the magnetic flux $\Phi$ to decrease in a manner $e - c - d$ shown in FIG. 5. Numeral 721c denotes a current detector which detects the current flowing in the armature 2 by means of a shunt resistor 907 and amplifies the detected current to produce a voltage output corresponding to the armature current. Numerals 721d and 721e denote diodes, 721f denotes a NOT circuit, and 721g and 721h denote analog switch circuits which are closed when gate signals are applied thereto to gate input signals. Numeral 722 denotes a known saw-tooth wave generator which generates a saw-tooth wave as shown by $a$ in FIG. 12(A), and numeral 723 denotes a comparator an output of which is shown in FIG. 12(B). Numeral 724 denotes an amplifier and 71 denotes a transistor which is turned on and off in response to an output of the amplifier 724. The field controller 7 comprises the transistor 71 and a transistor control circuit 72, which includes a function generator 721, the known saw-tooth wave generator 722 which may comprise an astable multivibrator and a bootstrap circuit, the comparator 723 and the amplifier 724. The function generator 721 comprises the command signal generators 721a and 721b, the current detector 721c, the diodes 721d 721e, the NOT circuit 721f and the analog switches 721g and 721h.

The operation of the above construction is now explained. As a driver slightly depresses the accelerator pedal, the first-speed limit switch 8a is closed to energize the exciting coil 4a of the first-speed magnet switch 4. As a result, the first-speed magnet switch 4 is closed so that a current flows in the armature 2 from the battery 1 through the first-position magnet switch 4, the armature controlling resistor 5 and the shunt resistor 907. At the same time, the constant voltage circuit 90 is powered and the first command signal generator 721a receives the potential of the potentiometer 8c to produce an output voltage which passes through the analog switch 721g and is composed with the saw-tooth wave voltage of the saw-tooth wave generator 722 in the comparator 723. An output of the comparator 723 is amplified by the amplifier 724, an output of which is applied to the base of the transistor 71. In this manner, a relatively small current flows into the shunt field winding through the path from the battery 1 through the first-speed magnet switch 4 and the shunt field winding 3 to the transistor 71 so that a relatively small magnetic flux as shown by the point a in FIG. 5 is produced.

As described above, the relation between the magnetic flux Φ of the shunt field winding 3 and the rotation speed N is given by $$N = \frac{E}{\Phi} \cdot k_1 - \frac{T(R + r)}{\Phi^2} \cdot k_3.$$

Figure 2:
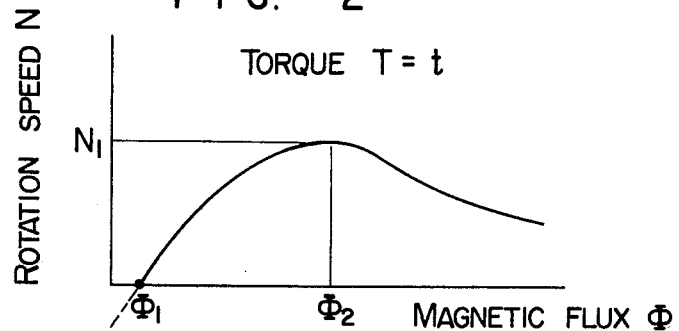
FIG. 2 shows a characteristic curve illustrating a relation between a magnetic flux Φ and a rotational speed N for the system shown in FIG. 1.

Accordingly, the magnetic flux Φ of the shunt field winding 3 is advantageously changed to increase the speed within a range in which the rotation speed N changes from zero to a maximum ($\Phi_1$ to $\Phi_2$ in FIG. 2). Since the magnetic flux Φ of the shunt field winding 3 is proportional to the current flowing into the shunt field winding 3, the output voltage of the first command signal generator 721a is set such that a duty factor of the transistor 71 increases in proportion to the step-in angle of the accelerator pedal. As a result, as the accelerator pedal is depressed, the shunt field winding 3 produces the magnetic flux between the points a and b shown in FIG. 5 so that the Motor M is speed controlled for the start-up and the low-speed range operation.

When the accelerator pedal is depressed, the potential of the potentiometer 8c rises so that the first command signal generator 721 operates to increase the field magnetic flux for increasing the speed of the car. As the accelerator pedal is further depressed, the potential of the potentiometer further rises above a value preset by the resistors 98 and 99, when the comparator 96 produces an output. When the armature voltage VA is above a value preset by the resistors 93 and 94, the comparator 95 produces an output. Thus, the AND circuit 97 produces an output. As a result, the second-speed magnet switch 6 is closed so that a full power supply voltage E is applied to the armature A. At the same time, the gate of the analog switch 721h is opened while the gate of the analog switch 721g is closed so that the magnetic flux Φ changes from the points b to c shown in FIG. 5 in accordance with the output of the second command signal generator 721b. As the accelerator pedal is further depressed, the magnetic flux is weakened until it reaches the point d shown in FIG. 5 where the car travels at full speed. The above is the operation when the accelerator pedal is gradually depressed.

Figure 11:
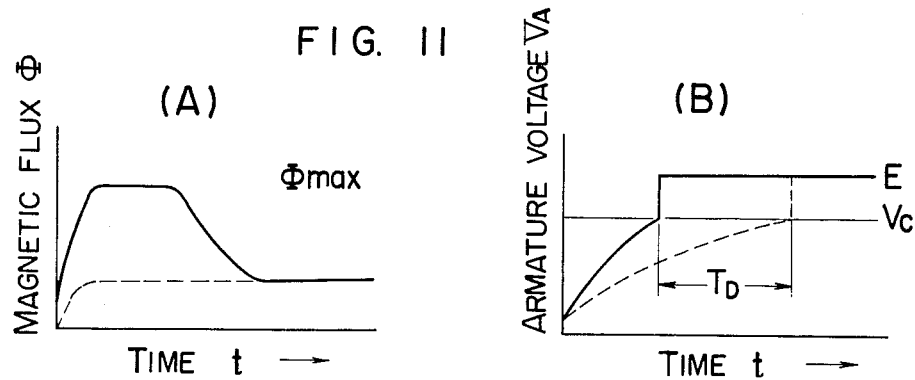
FIG. 11(A) shows a characteristic curve illustrating a relation between the time $t$ and the magnetic flux Φ for the system shown in FIG. 10.
FIG. 11(B) shows a characteristic curve illustrating a relation between the time $t$ and an armature voltage VA for the system shown in FIG. 10.

If the accelerator pedal is abruptly depressed to its maximum angle when the car has been stopped, the potential of the potentiometer reaches a maximum so that the first command signal generator 721a produces a maximum magnetic flux command while the second command signal generator 721b produces a minimum magnetic flux command, and the comparator 96 which acts as an accelerator pedal depression angle detector produces an output. Since the car is not accelerated rapidly because of its inertia but remains in the stopped condition or at a very low-speed, the voltage VA of the armature 2 is small and the comparator 95 which acts as an armature state detector does not produce an output. Accordingly, the AND circuit 97 does not produce an output so that the gate of the analog switch 721g is opened. As a result, a maximum magnetic flux corresponding to the point f shown in FIG. 5 is produced in the field of the motor 2 in accordance with the command of the first command signal generator 721a. Since the AND circuit 97 does not produce an output, the second-speed magnet switch 6 is open. Accordingly, the motor M is operated with the maximum magnetic flux with the armature controlling resistor 5 being inserted so that the motor M is accelerated under the maximum magnetic flux condition with the armature current being limited. Under this condition, since the magnetic flux is large, the torque is high and the motor is accelerated rapidly in a short time. This manner of operation is illustrated by solid lines in FIGS. 11 (A) and (B). As the rotation speed of the motor M increases until the armature voltage VA reaches $V_c$ corresponding to the preset value of the comparator 95 which acts as the armature state detector, the comparator 95 produces the output and the AND circuit 97 also produces the output. As a result, the two-speed magnet switch 6 is closed so that the full power supply voltage is applied to the armature 2. On the other hand, since the AND circuit 97 produces the output, the gate of the analog switch 721h is opened while the gate of the analog 721g is closed so that the magnetic flux Φ tends to be minimized in accordance with the command of the second command signal generator 721b. However, since the motor M is under acceleration at this time, the current flowing in the armature 2 is relatively large and hence the output voltage of the current detector 721c which is determined by the armature current is larger than the command voltage of the second command signal generator 721b. Accordingly, the magnetic flux Φ is controlled in accordance with the output voltage of the current detector 721c so that the magnetic flux Φ is reduced with the reduction of the armature current. When the output voltage of the current detector 721c eventually falls below the command voltage of the second command signal generator 721b, the magnetic flux Φ is settled at the point d shown in FIG. 5 corresponding to the command voltage of the second command signal generator 721b, and the motor M is operated at the maximum speed. When the accelerator pedal is depressed to the maximum angle, if the magnetic flux of the shunt field winding 3 is immediately moved to the point d shown in FIG. 5 is response only to the depression angle of the accelerator pedal, the magnetic flux of the shunt field winding 3 would change as shown by a dotted line in FIG. 11(A) and the armature voltage rises slowly as shown by a dotted line in FIG. 11(B) resulting in unsatisfactory acceleration. On the contrary, in the second embodiment of the present invention, since the AND circuit 97 is provided, the armature voltage rises rapidly as shown by the solid line in FIG. 11(B) saving time $T_D$ in acceleration time.

Figure 12:
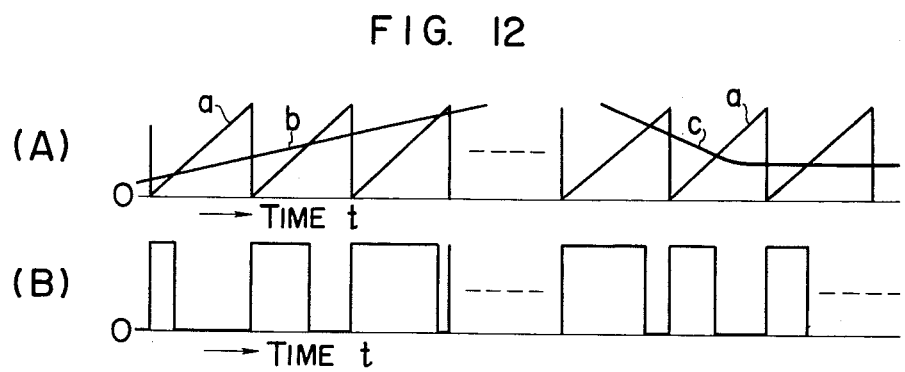
FIG. 12 shows waveforms for explaining the operation of a field control in the system shown in FIG. 10.
Figure 13:
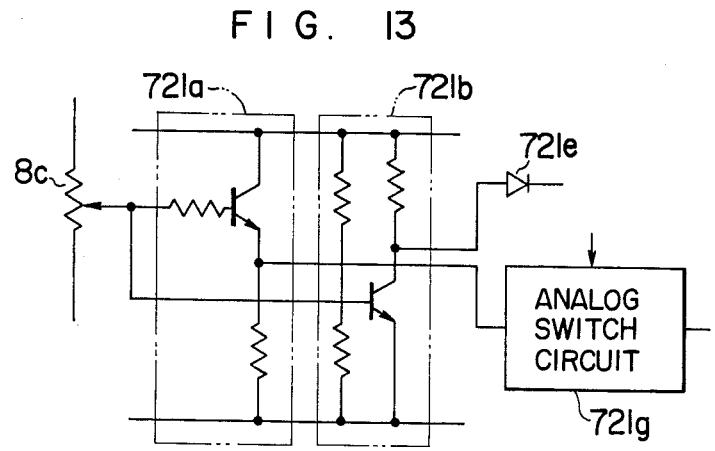
FIG. 13 is an electrical circuit diagram illustrating an example of first and second command signal generators used in the system shown in FIG. 10.

Referring to FIG. 12, the operation of the field controller 7 is explained. The saw-tooth wave generator 722 provides the output voltage as shown by a in FIG. 12(A), and this output voltage is applied to one input of the comparator 723. An output voltage of the function generator 721 as shown by b in FIG. 12(A) is applied to the other input of the comparator 723, which compares both voltages and produces an up level output as shown in FIG. 12(B) when the output voltage of the function generator 721 is higher than the output voltage of the saw-tooth wave generator 722. The output of the comparator 723 is applied to the amplifier 724, thence to the base of the transistor 71. Thus, the transistor 71 is turned on and off in accordance with the output of the comparator 723. The duty factor of the transistor 71 depends on the output voltage of the function generator 721 and it is higher as the output voltage becomes higher.

The first and second command signal generators 721a and 721b each may comprise an amplifier and an inverting amplifier each including a transistor and resistors, as shown in FIG. 3, and produce output voltages which are proportional and inversely proportional, respectively, to an output potential of the potentiometer 8c.

While the armature voltage is detected in the above embodiment to determine whether the shunt field winding has produced full magnetic flux to cause the armature to fully rotate, the armature current may be detected instead to determine whether the shunt field winding has produced the full magnetic flux to cause the armature to fully rotate. In certain cases, a delay circuit which produces an output a predetermined time after the closure of the first-speed magnet switch 4 may be used in place of the comparator 95 so that the armature controlling resistor 5 is shorted when the accelerator pedal is stepped in beyond a predetermined angle a predetermined time after the closure of the first-position magnet switch 4, at which time the shunt field winding 3 has produced full magnetic flux in accordance with the first command.

Figure 14:
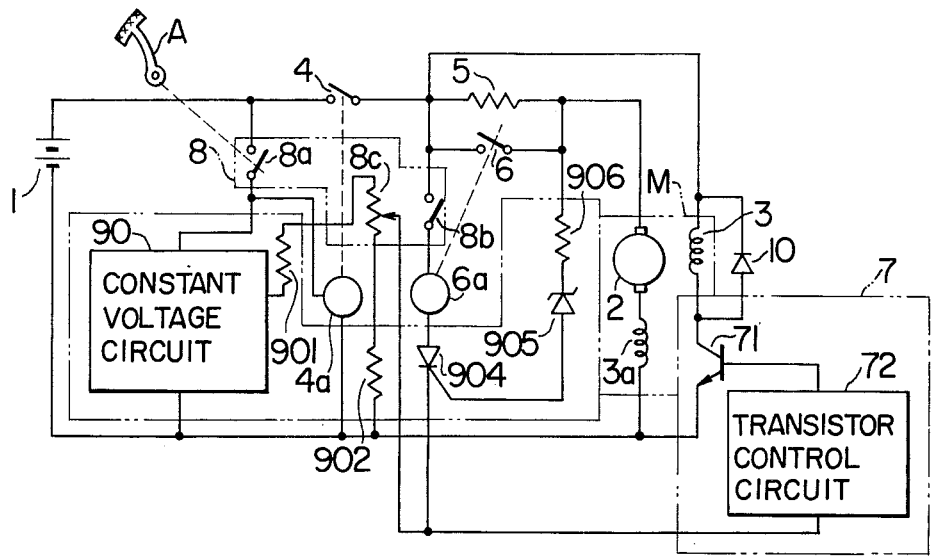
FIG. 14 is an electrical circuit diagram illustrating a third embodiment of the motor control system embodying the present invention.
Figure 17:
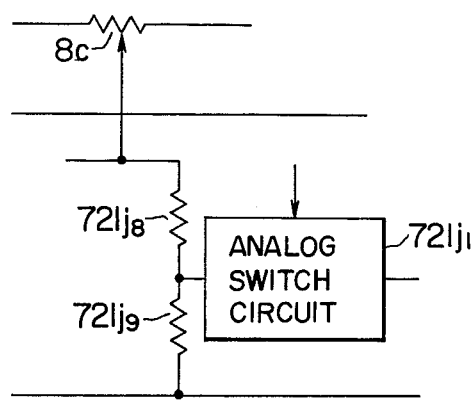
FIG. 17 is an electrical circuit diagram illustrating a major section of a fifth embodiment of the motor control system embodying the present invention.

FIG. 14 shows a third embodiment of the present invention, in which the motor M is a compound motor having a shunt field winding 3 and a series field winding 3a, and the armature voltage is detected by a zener diode 905 through a resistor 906 to control a thyristor 904 and the depression angle of the accelerator pedal A is detected by the second-speed limit switch 8b which is closed when the accelerator pedal A is stepped in beyond a predetermined angle (Φ shown in FIG. 5). The operation of the third embodiment is generally similar to that of the second embodiment shown in FIG. 10 except that the armature voltage VA is detected by the zener diode 905 and the accelerator pedal position is detected by the second-speed limit switch 8b, which is connected in series with the thyristor 904 to control the exciting winding 6a.

While the output of the function generator 721 and the output of the saw-tooth wave generator 722 are compared in the comparator 723 in the above embodiment to control the transistor 71 for controlling the field current in an open loop system, more satisfactory speed control will be attained by detecting the field current and controlling the field current in a feedback system.

While the shunt motor is used in the above embodiment, it should be understood that the present invention is also applicable to a compound motor.

Furthermore, although the single armature controlling resistor 5 is selectively shorted by the single magnet switch 6 in the above embodiment, a plurality of armature controlling resistors may be used together with a plurality of magnet switches.

Figure 15:
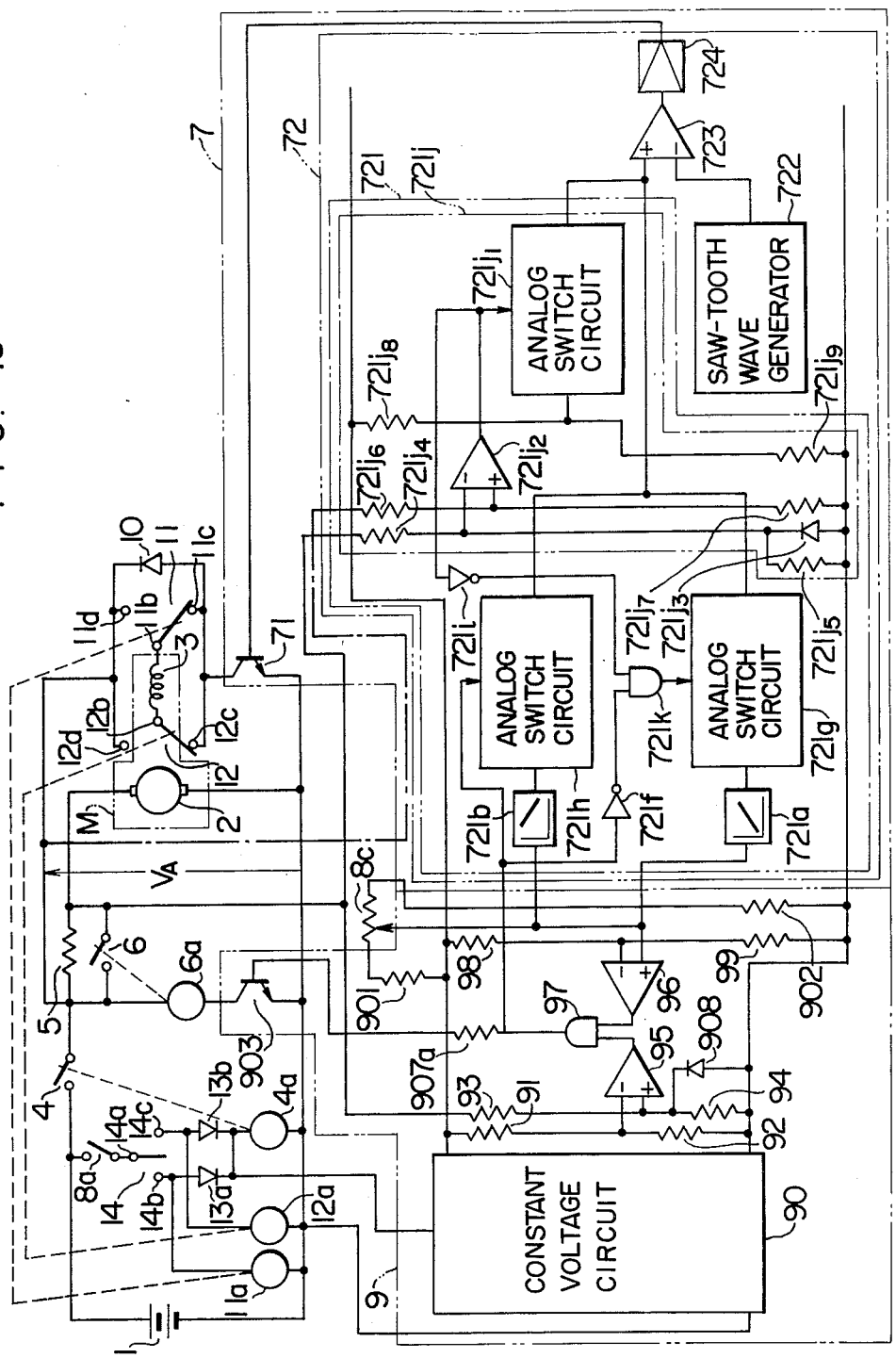
FIG. 15 is an electrical circuit diagram illustrating a fourth embodiment of the motor control system embodying the present invention.

Referring to FIG. 15, a fourth embodiment of the present invention is explained. In FIG. 15, like parts are represented by like reference numerals and are not explained here. Numerals 11 and 12 denote magnet switches for switching polarity of the shunt field winding 3. When exciting windings 11a and 12a are not energized, movable contacts 11b and 12b are positioned to normally close contacts 11c and 12c, respectively, and when the exciting windings 11a and 12a are energized, the movable contacts 11b and 12b are positioned to normally open contacts 11d and 12d. Numeral 13a and 13b denote diodes, 14 denotes a forward-backward switch for switching the direction of travel of the car. In a forward operation, a movable contact 14a is positioned to a forward contact 14b while in a backward operation it is positioned to a backward contact 14c. Numeral 908 denotes a diode, 721i denotes a NOT circuit, and 721j₁ denotes an analog switch which is closed when a gate signal is applied thereto to gate an input signal. Numeral 721j₂ denotes a comparator, 721k denotes an AND circuit, 721j₃ denotes a diode, and 721j₄, 721j₅, 721j₆, 721j₇, 721j₈ and 721j₉ denote voltage dividing resistors. The analog switch 721j₁, the comparator 721j₂, the diode 721j₃ and the resistors 721j₄ to 721j₉ form a switching circuit 721j; the first and second command signal generator 721a and 721b, the NOT circuits 721f and 721i, the analog switches 721g and 721h, the switching circuit 721j and the AND circuit 721k form the function generator 721; the function generator 721, the saw-tooth wave generator 722, the comparator 723 and the amplifier 724 forms the transistor control circuit 72; and the transistor control circuit 72 and the transistor 71 form the field controller 7 of transistor chopper type.

The operation of the above construction is now explained. When a driver positions the movable contact 14a of the forward-backward switch 14 to the forward contact 14b, for example, and depresses the accelerator pedal slightly, the first-speed limit switch 8a is closed and the exciting winding 11a of the magnet switch 11 is energized so that the movable contact 11b is positioned to the normally open contact 11d. (At this time, since the exciting winding 12a is not energized, the movable contact 12c of the magnet switch 12 is positioned to the normally close contact 12c. The exciting coil 4a of the first-speed magnet switch 4 is energized to close the first-speed magnet switch 4 so that a current flows into the armature 2 through a path from the battery 1 through the first-speed magnet switch 4, the armature controlling resistor 5 to the armature 2. At the same time, the constant voltage circuit 90 is energized and the first command signal generator 721a receives the potential of the potentiometer 8c to produce an output, which is passed through the analog switch 721g to the comparator 723 where it is compared with the output of the saw-tooth wave generator 722. The output of the comparator 723 is amplified by the amplifier 724 and thence applied to the base of the transistor 71. As a result, a relatively small current flows in the shunt field winding 3, which therefore produces a relatively small magnetic flux as shown by the point a in FIG. 5, so that the car runs at a low speed. The operations of the comparators 95, 96 and 721j₂, the AND circuits 97 and 721k, and the analog switches 721g, 721h and 721j₁ are now explained. When the accelerator pedal is depressed beyond a predetermined angle such that the potential of the potentiometer 8c exceeds the setting value $V_1$ determined by the dividing resistors 98 and 99, the comparator 96 produces an output. When the armature voltage exceeds the setting value $V_2$ determined by the dividing resistors 91 and 92, the comparator 95 produces an output. When both comparators 95 and 96 produce outputs, the AND circuit 97 produces an output. This output causes a base current of the transistor 903 to flow to energize the exciting winding 6a of the second-speed magnet switch 6 to close the second speed magnet switch 6. At the same time, the output of the AND circuit 97 opens the gate of the analog switch 721*h* to gate the input signal thereto. On the other hand, the reference potential of the comparator 721*j*$_2$ is set to zero while the armature voltage VA to be compared is slightly positive because of a resistance in the armature circuit. Accordingly, the comparator 721*j*$_2$ does not produce an output and the analog switch 721*j*$_2$ is not closed so that the input signal thereto is not gated. The analog switch 721*j*$_1$ is closed to gate the input signal thereto when the comparator 721*j*$_2$ produces the output, that is, when the voltage of the armature 2 is negative. On the other hand, the analog switch 721*g* is closed when the AND circuit 721*k* receives two inputs, that is, when neither the comparator 721*j*$_2$ or the AND circuit 97 produces the output, because of the presence of the NOT circuits 721*f* and 721*i*. Namely, the analog switch 721*g* is closed when the potential of the potentiometer 8*c* is below the setting value V$_1$ nor the armature voltage VA is below the setting value V$_2$ and the armature voltage VA is positive. Referring to FIG. 16, (A) and (B) show the changes of the potential of the potentiometer 8*c* and the armature voltage VA, respectively, with time, and (C), (D) and (E) show the gate conditions of the analog switches 721*g*, 721*h* and 721*j*$_1$, respectively. In the above explanation, the energized state of the shunt field winding 3 has been described. In a normal state of car travel, as the accelerator pedal is depressed the potential of the potentiometer 8*c* rises so that the magnetic flux of the shunt field winding 3 increases in accordance with the output of the first command signal generator 721*a* and the speed of the car increases. As the accelerator pedal is further depressed, the potential of the potentiometer 8*c* further rises until it exceeds the setting value by the resistors 98 and 99, at which time the comparator 96 produces an output. When the armature voltage VA exceeds the setting value determined by the dividing resistors 91 and 92, the comparator 95 produces the outputs. As a result, the AND circuit 97 produces the output so that the second-speed magnet switch 6 is closed to apply the full power supply voltage E to the armature 2. At the same time, the analog switch 721*h* is closed while the analog switch 721*g* is opened, and the magnetic flux Φ of the shunt field winding 3 is shifted from the points *b* to *c* shown in FIG. 5 in accordance with the command of the second command signal generator 721*b*. As the accelerator pedal is further depressed, the magnetic field of the shunt field winding 3 is weakened in accordance with the command of the second command signal generator 721*b* and it eventually reaches the point *d* in FIG. 5, where the car runs at full speed.

In a backward operation, the movable contact 14*a* of the forward-backward switch 14 is positioned to the backward contact 14*c* so that the movable contact 12*b* of the magnet switch 12 is positioned to the normally open contact 12*d* while the movable contact 11*b* of the magnet switch 11 is positioned to the normally close contact 11*c*. Thus, the connection of the shunt field winding 3 is reversed with respect to the forward operation. The rest of the speed control is exactly same as in the forward operation.

Now, let assume that a driver has been depressing the accelerator pedal to the maximum angle in the forward operation and suddenly positions the forward-backward switch 14 to the backward contact 14*c*. In this case, the polarity of the shunt field winding 3 is switched as described above, but the car runs forward because of its inertia so that the motor M is applied with reverse braking force to produce a negative voltage in the armature 2. This negative voltage is compared with zero potential by the comparator 721*j*$_2$, which produces the output which in turn closes the analog switch 721*j*$_1$. On the other hand, since the comparator 95 detects that the armature voltage is negative or below the setting value V$_2$, it does not produce output and the AND circuit 97 also does not produce an output. Thus, the transistor 903 is cut off to open the second-speed magnet switch 6 and open the analog switch 721*h*. Although one input of the AND circuit 721*k* receives the signal from the NOT circuit 721*f* because the AND circuit 97 does not produce the output, the other input of the AND circuit 721*k* does not receive a signal from the NOT circuit 721*j* because the comparator 721*j*$_2$ produces the output. Accordingly, the AND circuit 721*k* produces no output and the analog switch 721*g* is opened. In this manner, a constant field current which is produced by the comparison with the output of the saw-tooth wave generator 722 by the comparator 723 flows into the shunt field winding 3 in accordance with a third command which is optimized by the voltage determined by the dividing resistors 721*j*$_8$ and 721*j*$_9$. Thus, the car is applied with a reverse braking force by the magnetic flux or torque selected to give optimum feeling to a passenger, and the speed of the car is decreased. When the car is stopped, the armature voltage is shifted from negative to zero and then to positive. This positive armature voltage is compared with the zero potential by the comparator 721*j*$_2$ so that the comparator 721*j*$_2$ does not produce an output and the analog switch 721*j*$_1$ is opened. The AND circuit 721*k* is met because of the NOT circuit 721*i* so that it produces an output, which closes the analog switch 721*g*. When the car is stopped or at a low speed range, the armature voltage has not fully risen. Accordingly, the comparator 95 does not produce the output and hence the AND circuit 97 also does not produce an output. As a result, the second-speed magnet switch 6 is opened and the NOT circuit 721*f* produces an output. Accordingly, the car is accelerated with the resistor 5 being inserted in series with the armature circuit and with a large shunt field flux as shown by the point *f* in FIG. 5 being applied. When the armature voltage exceeds the preset value, the resistor 5 is shorted as described above and the analog switch 721*h* is gated so that the magnetic flux of the shunt field winding 3 reaches the point *d* shown in FIG. 5, where the car speed reaches the maximum value.

The diodes 708 and 721*j*$_3$ serve to prevent the negative voltage produced in the armature 2 from being applied to the comparators 95 and 721*j*$_2$ beyond the predetermined value for protecting the comparators 95 and 721*j*$_2$.

While the negative voltage of the armature voltage during the reverse braking operation of the motor M is detected in the above embodiment, in a small car which uses a smalled motor, the resistance *r* of the armature 2 may be so large that the voltage drop across the resistor *r* may be larger than the induced voltage depending on a particular car speed and hence the negative voltage may not be produced. In such a case, the setting voltage of the comparator 721*j*$_2$ may be selected to be lower than $(r/R + r)$ E which is a voltage produced when the motor is locked. Since the power supply is a battery, the power supply voltage E may differ between the early stage and the final stage of the charging cycle. In order to compensate for this difference, the power supply voltage may be divided by the resistor $721j_6$ and $721j_7$ as shown by a chain line in FIG. 15 so that a more comfortable feeling is given to the passengers.

While the field is maintained constant during the reverse braking operation in the fourth embodiment, in certain cases it is desired to change the braking force in accordance with the depressed angle of the accelerator pedal. In such a case, instead of powering the resistors $721j_8$ and $721j_9$ from the constant voltage circuit 90, they may be powered from the potentiometer 8c as shown in FIG. 8c so that the command signal during the reverse braking operation is issued in association with the potential of the potentiometer 8c.

What is claimed is:

1. A control system for a motor having a shunt field winding, comprising:
   power supply circuit means including a power supply for powering said motor;
   motor control means for generating a control amount;
   means for generating a command signal to command the amount of increase or decrease of a rotational speed of said motor in accordance with the control amount of said motor control means;
   means connected to said means for generating the command signal for controlling a field current; and
   said means for generating the command signal including control signal generating means for increasing said field current independently of said power supply voltage in accordance with the control amount when positive acceleration control is effected within a predetermined control range.

2. A control system for a motor according to claim 1 wherein said predetermined control range corresponds to a maximum rotation obtainable by the increase of the magnetic flux produced by the field of the shunt field winding of said motor.

3. A control system for a motor according to claim 2 wherein said means for generating the command signal further includes control signal generating means for reducing said field current independently of said power supply voltage in accordance with the control amount when the control amount exceeds the predetermined range.

4. A control system for a motor according to claim 3 further including a resistor for limiting the armature current of said motor, and wherein said means for generating the command signal further includes means for short-circuiting said resistor when the control amount exceeds said predetermined range.

5. A control system for a motor according to claim 4 wherein said means for generating the command signal comprises a potentiometer an output potential of which increases in accordance with the control amount and a potentiometer an output potential of which decreases in accordance with the control amount.

6. A control system for a motor having a shunt field winding, comprising;
   power supply circuit means including a power supply for powering said motor;
   control means for changing the rotational speed of said motor in accordance with a control amount;
   electrical control signal generating means for increasing the field current independently of said power supply voltage in accordance with the control amount when said control means is operated as a positive acceleration control within a predetermined rotational speed range of said motor; and
   switching means connected to said control signal generating means for turning on and off said field current in accordance with said electrical control signal.

7. A control system for a motor according to claim 6 wherein said predetermined rotational speed range corresponds to a maximum rotational speed obtainable by the increase of magnetic flux produced by the shunt field winding of said motor.

8. A control system for a motor according to claim 6 wherein said control signal generating means further includes control signal generating means for reducing the field current in accordance with the control amount of said control means when said motor is operated beyond said predetermined rotational speed range.

9. A control system for a motor according to claim 8 wherein said conrol signal generating means comprises first means for sensing said predetermined range of rotational speed of said motor, second means for sensing a predetermined control amount of said control means, first circuit means for generating a control signal to increase the field current in accordance with the increase of the control amount of said control means, second circuit means for generating a control signal to reduce the field current in accordance with the increase of the control amount of said control means, and gate means including control means connected to both of said sensing means, said gate means being connected between said first and second circuit means and switching means for controlling said field current, said gate means connecting said first circuit means to said switching means until the rotational speed of said motor reaches said predetermined rotational speed and connecting said second circuit means to said switching means when the rotational speed of said motor exceeds said predetermined rotational speed and the control amount exceeds said predetermined range.

10. A control system for a motor according to claim 9 wherein said control signal generating means further comprises third sensing means for sensing the reverse operation of said motor, third circuit means for producing a predetermined motor control signal and second gate means including control means connected to said third sensing means, said second gate means disconnecting said first and second circuit means from said field current switching means and connecting said third circuit means to said switching means during the reverse operation.

* * * * *